(12) United States Patent  (10) Patent No.: US 8,117,691 B2
Bishop  (45) Date of Patent: Feb. 21, 2012

(54) ADJUSTABLE SUSPENSION SLEEP DEVICE AND METHOD OF USE

(76) Inventor: Louis L. Bishop, Mitchellville, IA (US)

( * ) Notice: Subject to any disclaimer, the term of this patent is extended or adjusted under 35 U.S.C. 154(b) by 320 days.

(21) Appl. No.: 12/372,869

(22) Filed: Feb. 18, 2009

(65) Prior Publication Data
US 2009/0205131 A1  Aug. 20, 2009

Related U.S. Application Data

(60) Provisional application No. 61/029,440, filed on Feb. 18, 2008, provisional application No. 61/092,556, filed on Aug. 28, 2008.

(51) Int. Cl.
A47C 17/64 (2006.01)
(52) U.S. Cl. ............................. 5/118; 5/122; 296/190.02
(58) Field of Classification Search .............. 5/122, 127, 5/129, 130, 9.1, 10.1, 118–120, 123; 296/190.02
See application file for complete search history.

(56) References Cited

U.S. PATENT DOCUMENTS

| 2,745,115 | A | 5/1956 | Reiss |
| 2,960,992 | A | 11/1960 | Klipfel |
| 3,410,598 | A | 11/1968 | Davis et al. |
| 3,411,819 | A | 11/1968 | Tyree et al. |
| 3,479,079 | A | 11/1969 | Coursault |
| 3,575,460 | A | 4/1971 | Kennedy |
| 3,588,168 | A | 6/1971 | Froitzheim et al. |
| 3,599,651 | A | 8/1971 | Perry |
| 3,603,330 | A | 9/1971 | Halldorson et al. |
| 3,661,418 | A | 5/1972 | Stewart |
| 3,712,316 | A | 1/1973 | Leonard |
| 3,713,687 | A | 1/1973 | Hooks et al. |
| 3,790,207 | A | 2/1974 | Anderson |
| 3,837,700 | A | 9/1974 | Van Slyke |
| 3,863,977 | A | 2/1975 | Hardinge |
| 3,879,081 | A | 4/1975 | Hockley et al. |
| 3,881,644 | A | 5/1975 | Demaline |

(Continued)

FOREIGN PATENT DOCUMENTS

DE  202 02 040 U1  6/2003

(Continued)

OTHER PUBLICATIONS

Notification of the International Search Report and the Written Opinion of the International Searching Authority (EP); PCT/US2009/034389; filed Feb. 18, 2009.

(Continued)

Primary Examiner — Robert G Santos
Assistant Examiner — Nicholas Polito
(74) Attorney, Agent, or Firm — Boardman & Clark LLP

(57) ABSTRACT

An adjustable suspension sleep device is provided to suspend and individual while sleeping. The adjustable suspension sleep device has a body support assembly having a first and second longitudinally extending sides spaced apart by first and second ends. A first adjustable tensioning assembly is in communication with the first side of the body support assembly and a second adjustable tensioning assembly is in communication with the second side of the body support assembly. Further, a first suspension support assembly is in communication with the first end of the body support assembly and a second suspension support assembly in communication with the second end of the body support assembly. The first and second adjustable tensioning assemblies each include a tension adjustment device. A method of use for the adjustable suspension sleep device is also disclosed.

18 Claims, 8 Drawing Sheets

U.S. PATENT DOCUMENTS

| | | | |
|---|---|---|---|
| 3,929,145 A | 12/1975 | Schroeder | |
| 4,027,911 A | 6/1977 | Johnson | |
| 4,057,285 A | 11/1977 | Bemos | |
| 4,065,166 A | 12/1977 | Shoemaker | |
| 4,192,543 A | 3/1980 | Crawford | |
| 4,197,601 A | 4/1980 | Maguire | |
| 4,215,899 A | 8/1980 | Schmidt et al. | |
| 4,220,369 A | 9/1980 | Whitley et al. | |
| 4,221,424 A * | 9/1980 | Eiserman et al. | 296/152 |
| 4,223,689 A | 9/1980 | Cox | |
| 4,487,451 A | 12/1984 | Fiorini | |
| 4,739,528 A | 4/1988 | Allen | |
| 4,774,734 A | 10/1988 | Mills | |
| 4,807,314 A * | 2/1989 | Fry et al. | 5/118 |
| 4,930,837 A | 6/1990 | Marsh et al. | |
| 4,940,277 A | 7/1990 | Buell | |
| 4,973,101 A | 11/1990 | Sagstetter et al. | |
| 4,979,248 A | 12/1990 | Kelley | |
| 5,011,216 A | 4/1991 | Baughman | |
| 5,031,652 A | 7/1991 | Lester | |
| 5,061,006 A | 10/1991 | Baughman | |
| 5,066,065 A | 11/1991 | Baughman | |
| 5,092,650 A | 3/1992 | Perlot | |
| 5,170,521 A * | 12/1992 | Light | 5/118 |
| 5,193,235 A | 3/1993 | Kircher | |
| 5,226,689 A | 7/1993 | Roe et al. | |
| 5,238,288 A | 8/1993 | Chandler | |
| 5,339,851 A | 8/1994 | Miller et al. | |
| 5,544,373 A | 8/1996 | Chang | |
| 5,611,414 A | 3/1997 | Walker | |
| 5,638,560 A | 6/1997 | Rigdon et al. | |
| 5,738,130 A | 4/1998 | Thomas | |
| 5,984,404 A | 11/1999 | Novoa et al. | |
| 6,029,875 A | 2/2000 | Johnston | |
| 6,035,875 A | 3/2000 | Chen | |
| 6,213,531 B1 | 4/2001 | Corey et al. | |
| 6,230,340 B1 | 5/2001 | Edwards | |
| 6,343,613 B1 | 2/2002 | Yasutomi | |
| 6,349,865 B1 | 2/2002 | Tolley et al. | |
| 6,371,144 B1 | 4/2002 | Ragatz | |
| 6,470,517 B1 | 10/2002 | Kang | |
| 6,668,397 B2 | 12/2003 | Olenick et al. | |
| 6,988,760 B2 | 1/2006 | Rasmussen | |
| 7,025,406 B2 | 4/2006 | Capp | |
| 7,073,216 B2 | 7/2006 | Schwingeler et al. | |
| 7,168,111 B2 | 1/2007 | Bernstein et al. | |
| 7,210,724 B2 | 5/2007 | Bernstein et al. | |
| 7,316,119 B2 | 1/2008 | Allen | |
| 7,444,691 B2 | 11/2008 | Gardner | |

FOREIGN PATENT DOCUMENTS

| | | |
|---|---|---|
| DE | 203 00 029 U1 | 9/2003 |
| JP | 07 164957 A | 6/1995 |
| WO | PCT/US2009/034389 | 2/2009 |

OTHER PUBLICATIONS

Preliminary Report on Patentability, dated Sep. 2, 2010, for PCT/US09/034389.

* cited by examiner

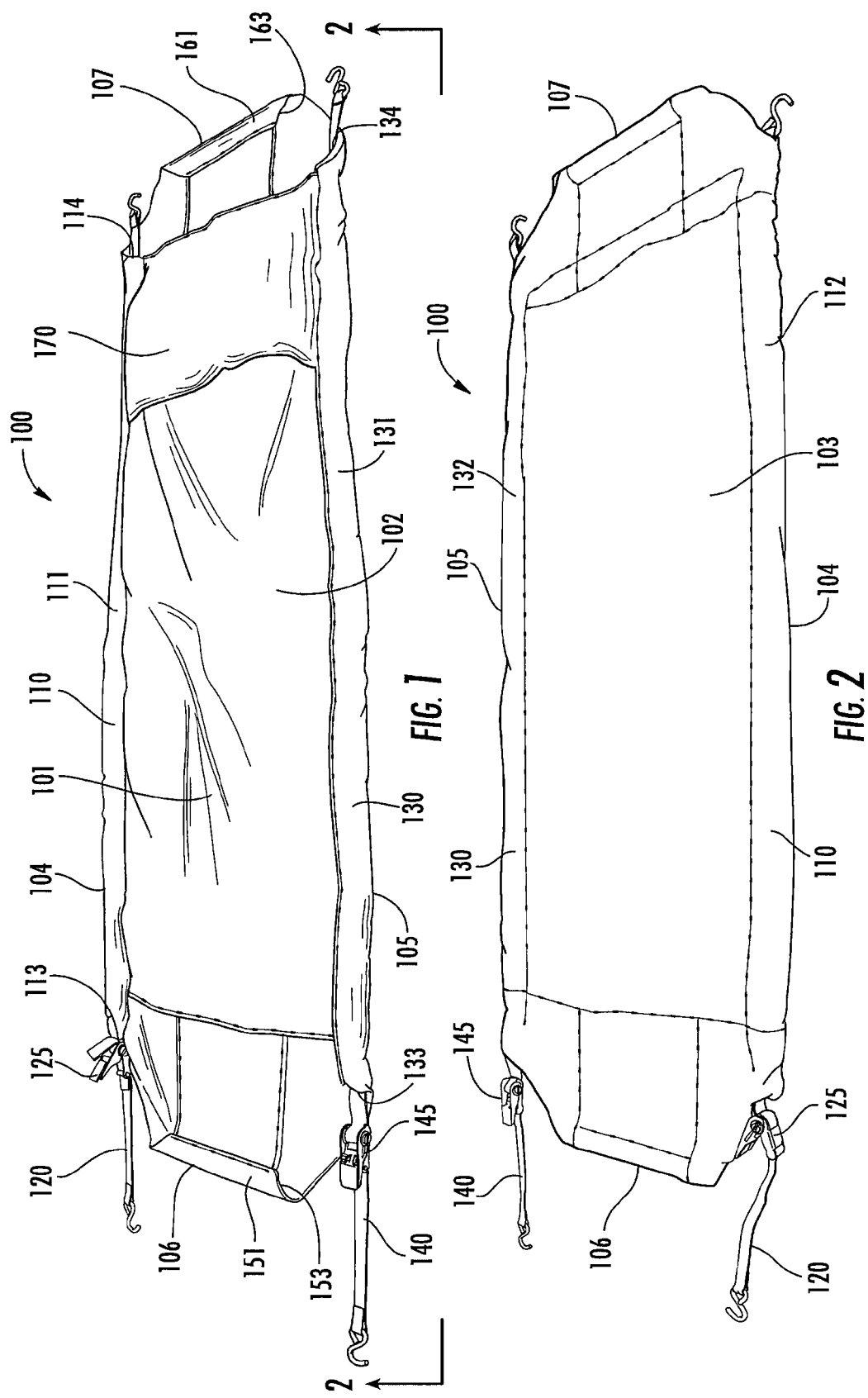

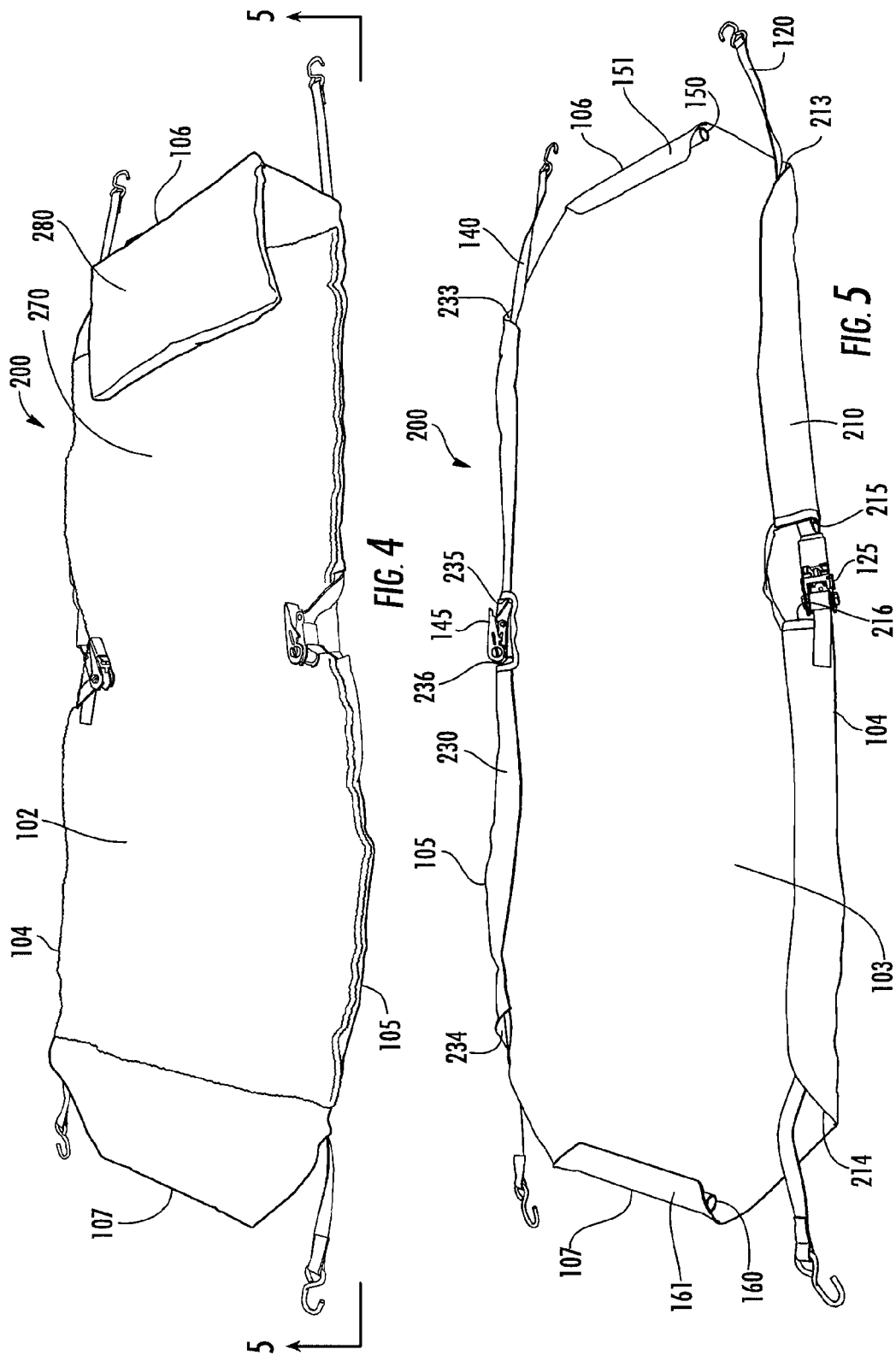

ADJUSTABLE SUSPENSION SLEEP DEVICE AND METHOD OF USE

CROSS-REFERENCE TO RELATED APPLICATIONS

This application claims priority from U.S. Provisional Application Ser. No. 61/029,440, filed Feb. 18, 2008, entitled MY INVENTION IS A NAP-SAC KIT THAT HANGS SUSPENDED FROM THE TWO DOORS AND WINDOWS IN ANY TYPE OF VEHICLE AND PROVIDES A PLACE TO SLEEP OR REST ALL INSIDE THE VEHICLE; and U.S. Provisional Application Ser. No. 61/092,556, filed Aug. 28, 2008, entitled A NAP-SAC KIT HANGS SUSPENDED FROM THE TWO DOORS AND WINDOWS IN ANY TYPE OF VEHICLE AND PROVIDES A PLACE TO SLEEP OR REST INSIDE THE VEHICLE, the contents all of which are hereby incorporated in their entirety by reference.

FIELD OF THE INVENTION

The present invention generally relates to devices used for sleeping. More specifically, the present invention relates to a sleeping device which suspends the user above the ground or other surface.

BACKGROUND

Beds and other sleep devices for use in and around vehicles are well known. Sleep devices may be located around the vehicle in a variety of places, for example in the bed of a pick-up truck, mounted to the roof of a vehicle, or attached to the rear of the vehicle to enable a user to access the device from the cab or passenger compartment through the trunk. However, each of these devices is located outside of the cab or passenger compartment of the vehicle. To prepare these devices for use, the user must exit the vehicle and physically set up the sleep device. Further, these sleep devices do not protect the user from extreme weather conditions, especially extreme cold, wind or precipitation. Further, in a situation where the vehicle has been in an accident or has inadvertently traveled off of the road, for example sliding off the road due to snow and/or ice, these devices may not be used as they require the vehicle to be positioned on flat, stable ground, often with a clear area around the vehicle. Accordingly, it would be advantageous to enable a sleeping device to be used within the cab or passenger compartment of the vehicle while limiting exposure to weather conditions during set up of the device.

Beds or sleep devices may also be located inside of the cab or passenger compartment of a vehicle. These devices often include a flat rectangular deck which may be positioned on top of or around the seats within the cab or passenger compartment of the vehicle. However, these devices often do not take into account users of different heights or lengths. Specifically, these devices are arranged perpendicular to the seats within the cab or passenger compartment of the vehicle. Accordingly, a user is confined to the space between the sides of the vehicle frame, usually between the vehicle doors. A user who is taller or longer than the distance between the frame or doors is unable to comfortably rest, as the user is unable to extend their body. It would be advantageous to allow a user to be comfortably supported by a sleeping device within the confines of a vehicle cab or passenger compartment.

Suspendable sleep devices for use in a vehicle are also known. U.S. Pat. No. 4,221,424 to Eiserman et al. discloses a hammock-like sleeping device which suspends between the doors of a vehicle, specifically a semi-truck cab. However, the Eiserman device does not secure a user within the sleeping device, creating a significant physical risk to the user of falling out of the hammock-like device. It would be advantageous to provide the user with a feature which would enclose the user into the sleeping device and reduce the risk of falling out of the device.

SUMMARY

An adjustable suspension sleep device is disclosed for suspending a person while sleeping. The adjustable suspension sleep device has a body support assembly having a first and second longitudinally extending sides spaced apart by first and second ends, a first adjustable tensioning assembly in communication with the first side of the body support assembly, a second adjustable tensioning assembly in communication with the second side of the body support assembly, a first suspension support assembly in communication with the first end of the body support assembly, and a second suspension support assembly in communication with the second end of the body support assembly.

A method of using the adjustable suspension sleep device is also provided. In the method, the first ends of the first and second adjustable tensioning assemblies are wrapped around a portion of a frame of a vehicle, followed by engagement of the first attachment members of the first and second adjustable tensioning assemblies. The first suspension support assembly is then engaged with the vehicle. The second ends of the first and second adjustable tensioning assemblies are wrapped around a portion of the frame of a vehicle, followed by engagement of the second attachment members of the first and second adjustable tensioning assemblies. The second suspension support assembly is then engaged with the vehicle. The first and second tension adjustment devices are then adjusted to increase the tension of the first and second adjustable tensioning assemblies, resulting in suspension of the adjustable suspension sleep device from the frame of the vehicle.

One or more embodiments of the present invention result in advantages not provided by vehicular sleep devices known in the art. Specifically, the adjustable suspension sleep device limits exposure to weather conditions during device set up and use, as the device may be set up and used within the cab or passenger compartment of a vehicle. In addition, the adjustable suspension sleep device comfortably supports users of different heights or lengths, as the user is suspended in the air, naturally hanging between the two ends of the adjustable suspension sleep device. Moreover, the tensioning feature of the adjustable suspension sleep device encloses the user into the sleeping device, reducing the risk of bodily injury caused by falling out of the device.

BRIEF DESCRIPTION OF THE DRAWINGS

FIG. 1 is an isometric view of an adjustable suspension sleep device according to one of more examples of embodiments, showing the front side of the sleep device from the top down.

FIG. 2 is an isometric view of the adjustable suspension sleep device of FIG. 1 taken along line 2-2 of FIG. 1, showing the back side of the sleep device from the bottom up.

FIG. 4 is an isometric view of an alternative embodiment of an adjustable suspension sleep device, showing the front side of the sleep device from the top down.

FIG. 5 is an isometric view of the adjustable suspension sleep device of FIG. 4 taken along line 5-5 of FIG. 4, showing the back side of the sleep device from the bottom up.

DETAILED DESCRIPTION

Figure 12:
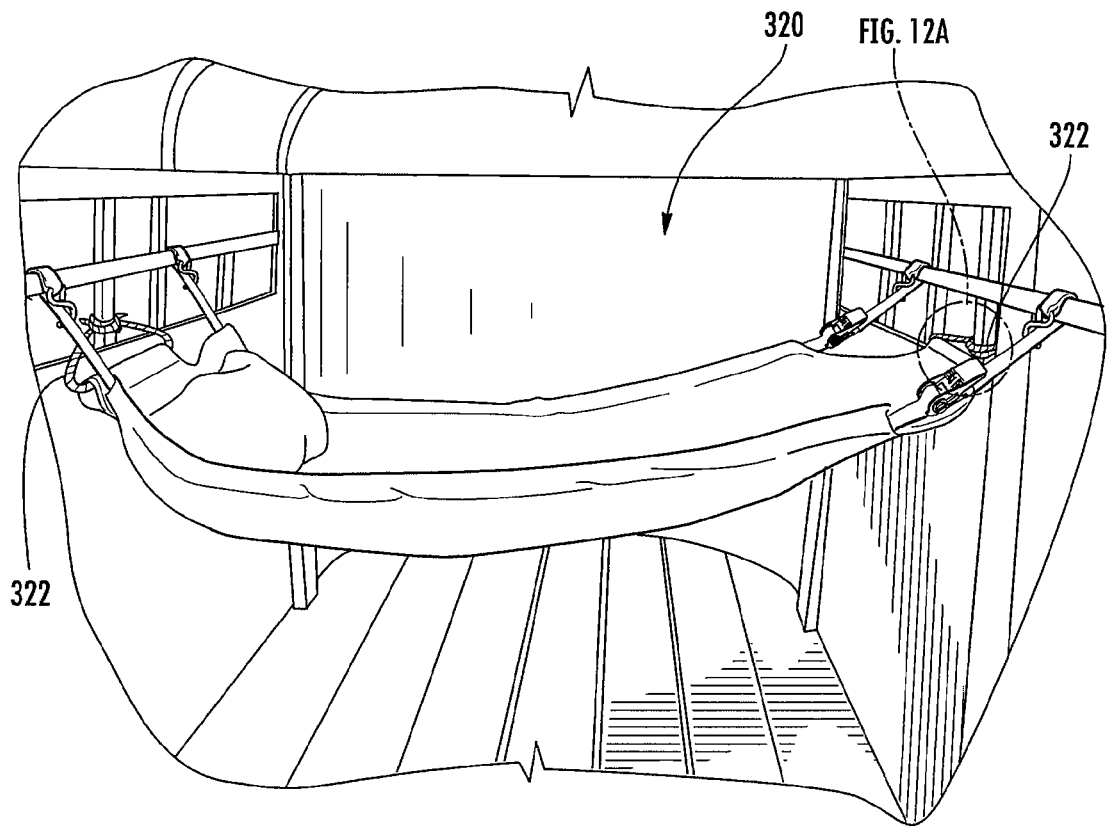
FIG. 12 is an isometric view of an adjustable suspension sleep device of FIG. 1, illustrating the device suspended inside of a trailer.
Figure 13:
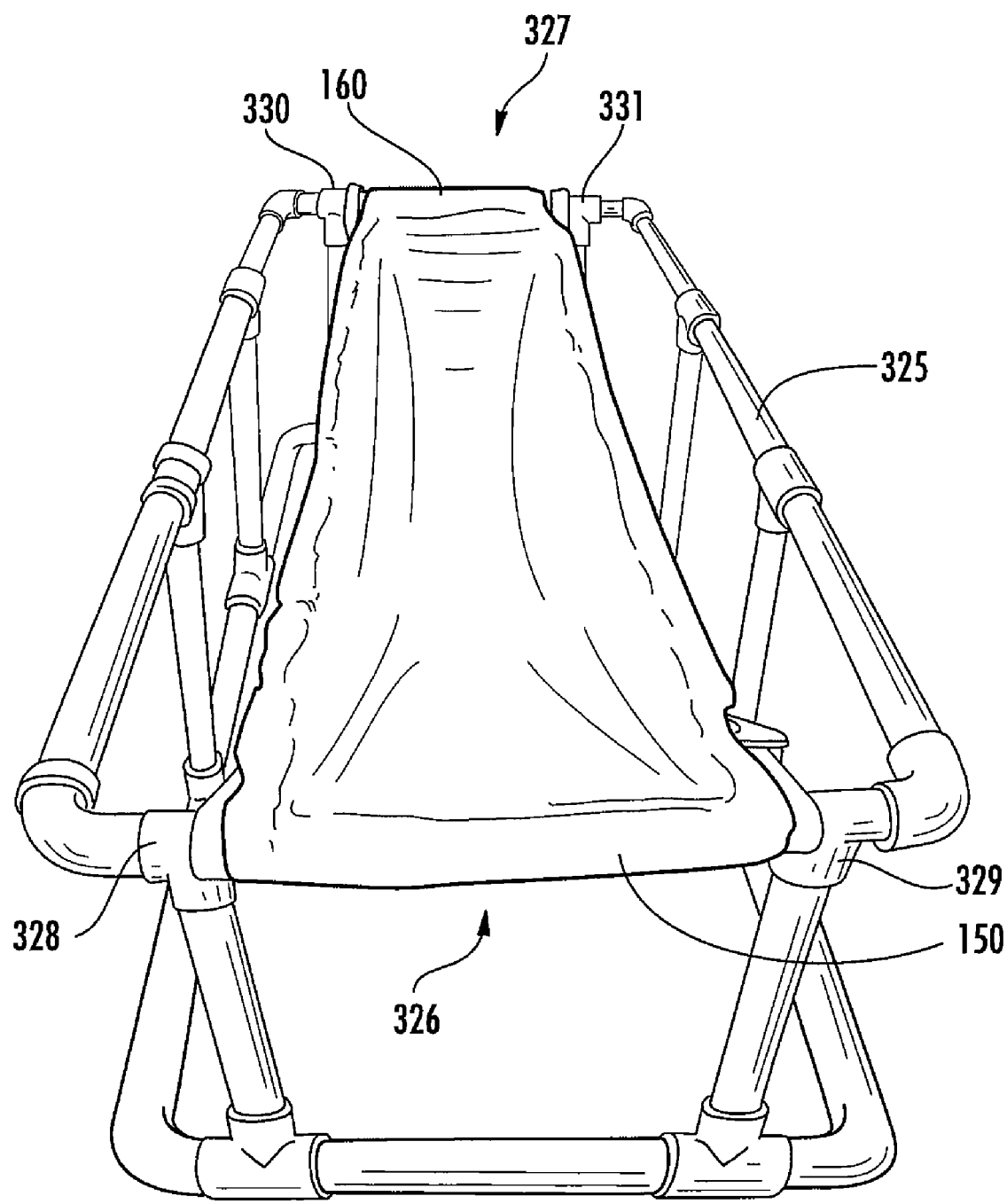
FIG. 13 is an isometric view of an adjustable suspension sleep device of FIG. 1, illustrating the device suspended upon a stand.

The following presents one or more examples of embodiments of an adjustable suspension sleep device 100. For ease of discussion and understanding, the following detailed description and illustrations refer to the adjustable suspension sleep device 100 for use with a vehicle and more specifically, to be suspended inside of the cab or passenger compartment of a vehicle between the vehicle doors. It should be appreciated that a "vehicle" is provided for purposes of illustration and the adjustable suspension sleep device 100 may be mounted, attached to, suspended between, or hung upon any other structure suitable for supporting an adjustable, suspendable sleep device. For example, the adjustable suspension sleep device 100 may be suspended inside of a trailer as illustrated in FIG. 12. Further, the adjustable suspension sleep device 100 may be suspended within a free standing frame or stand as illustrated in FIG. 13.

FIGS. 1 and 2 illustrate an isometric view of an adjustable suspension sleep device 100 in accordance with one or more examples of embodiments of the present invention. The adjustable suspension sleep device 100 includes a bodily support assembly or structure 101. As shown in FIG. 1, the bodily support assembly or structure 101 is illustrated to be generally rectangular in shape, but it is contemplated that the bodily support assembly or structure 101 may be formed of any shape without departing from the overall scope of the present invention. The bodily support assembly or structure 101 may be formed of different lengths and widths to compensate for different sized users or operators and different sized vehicles or end uses. The bodily support assembly or structure 101 is generally formed from of a textile or other similar material of sufficient strength to support an individual and the associated force or weight of an individual thereon, as well as to withstand stresses placed upon the adjustable suspension sleep device 100 thereby. To this end, the bodily support assembly or structure 101 may be formed of canvas, polyester, wool, nylon, polypropylene, or any other animal, plant, mineral, or synthetic textile. The bodily support assembly or structure 101 may also be formed of stretchable or elastic materials, such as, for example, Lycra®, spandex or elastane, or any other elastic textile.

Referring to FIGS. 1 and 2, the bodily support assembly or structure 101 may include a front or face side 102 and a back or rear side 103. The front or face side 102 generally is the side which removably receives and supports the user or operator during the operation and use of the adjustable suspension sleep device 100. However, it is contemplated that the bodily support assembly or structure 101 may be reversible, such that a user or operator may be removably received by the back or rear side 103 of the bodily support assembly or structure 101 during operation and use of the adjustable suspension sleep device 100.

The bodily support assembly or structure 101 may also include a first side 104, a second side 105, a first end 106, and a second end 107. As best illustrated in FIGS. 1 and 2, the first side 104 and second side 105 of the bodily support assembly 101 are generally parallel to one another and extend generally longitudinally along the sides or borders of the bodily support assembly 101. The first end 106 and second end 107 are also generally parallel to one another and extend generally perpendicularly to the first side 104 and second side 105 of the bodily support assembly 101. The first side 104 and second side 105 may be spaced apart from each other by the first end 106 and second end 107.

Figure 3:
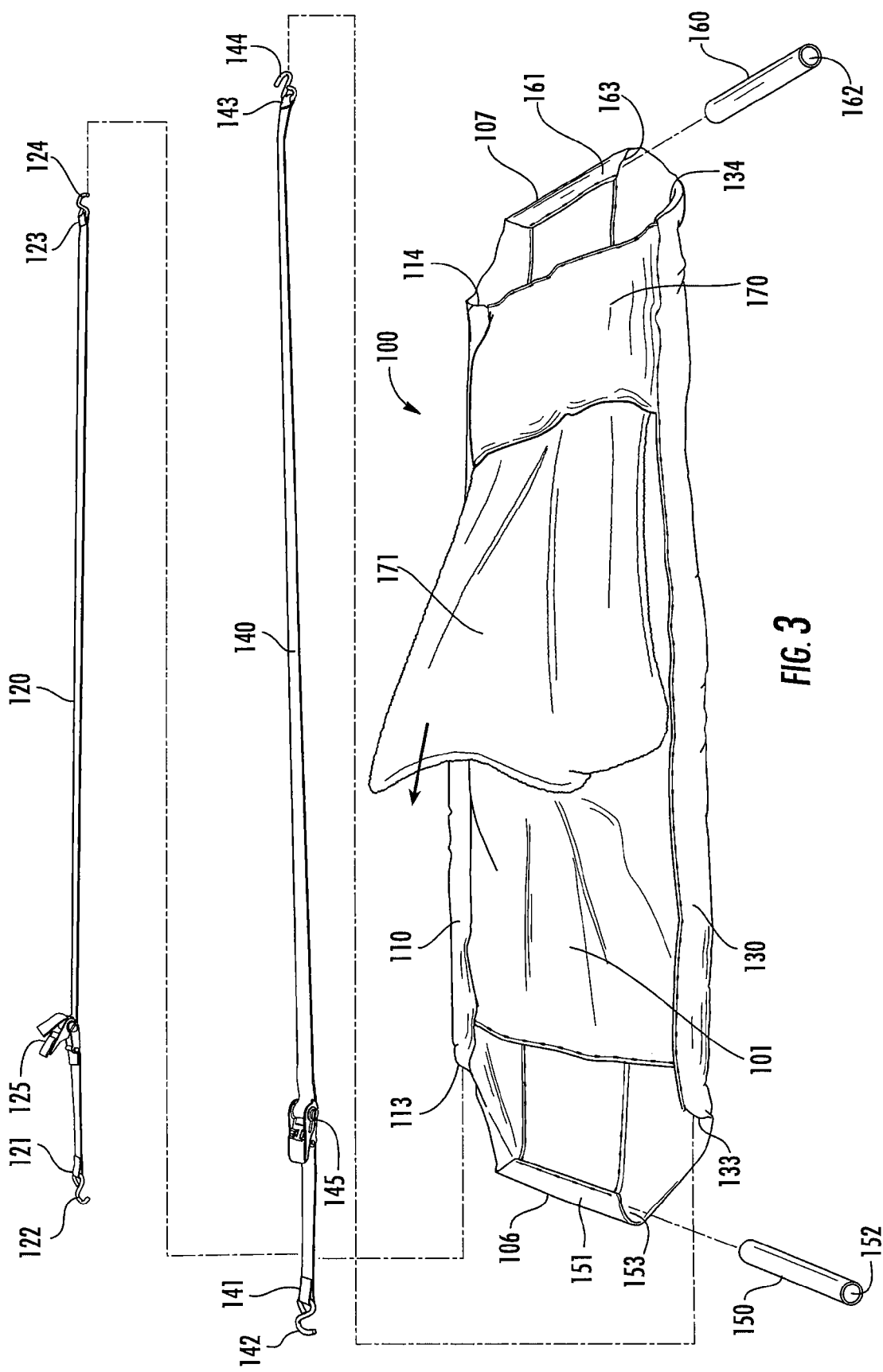
FIG. 3 is an exploded view of the adjustable suspension sleep device shown in FIG. 1.

The bodily support assembly 101 may also include a first retention device or structure 110. As illustrated in FIGS. 1-3, the first retention device or structure 110 may generally be positioned along the first side 104 of the bodily support assembly 101. The first retention device 110 generally forms a longitudinal passage or tunnel or pocket or channel along the first side 104 of the bodily support assembly 101. In one or more examples of embodiments, the first retention device 110 may by formed separately from the bodily support assembly 101 and mounted or attached thereto. Further, in one or more examples of embodiments, the first retention device 110 may extend along a portion of the first side 104 of the bodily support assembly 101. However, it is contemplated that the first retention device 110 may extend the entire length or substantially the entire length of the bodily support assembly 101. The first retention device 110 may be formed of a similar material as the bodily support assembly 101. Additionally, the first retention device 110 may be formed of any other suitable material, including, but not limited to a rigid material, such as steel or aluminum, or a textile with the strength to retain an adjustable tensioning device and support a portion of the adjustable suspension sleep device 100 during operation or use.

The first retention device or structure 110 may also include a first portion 111, a second portion 112, a first opening or aperture 113, and a second opening or aperture 114. As shown in FIGS. 1-3, the first retention device or structure 110 may have a first portion 111 which directly opposes the second portion 112 to form the passage or tunnel or pocket or channel therebetween. The first opening or aperture 113 is positioned toward the first end 106 of the bodily support assembly 101. The second opening or aperture 114 is positioned toward the second end 107 of the bodily support assembly 101 and positioned a distance apart from the first opening or aperture 113. The first opening or aperture 113 and second opening or aperture 114 may provide access to the passage or tunnel or pocket or channel of the first retention device or structure 110.

The first retention device or structure 110 may also include a first adjustable tensioning assembly 120. As illustrated in FIGS. 1-3, the first adjustable tensioning assembly 120 may be a belt or strap generally formed of nylon, polyester, polypropylene or other animal, plant, mineral or synthetic textile with sufficient strength and flexibility to support a portion of the adjustable suspension sleep device 100 during operation or use. The first adjustable tensioning assembly 120 may have a first end 121 and a second end 123. Connected to the first end 121 of the first adjustable tensioning assembly 120 is a first attachment member 122. Connected to the second end 123 of the first adjustable tensioning assembly 120 is a second attachment member 124. The first and second attachment members 122, 124 generally may be S-hooks. In one or more examples of embodiments, the first and second attachment members 122, 124 may be formed of metal or plastic. Further, in one or more examples of embodiments, the first and second attachment members 122, 124 may be a bolt snap, snap hook, carabiner, trigger snap, Velcro®, or other type of hook or connector.

The first adjustable tensioning assembly 120 may also include a first tension adjustment device 125. As shown in FIGS. 1 and 3, the first tension adjustment device 125 may be a ratchet buckle and may be located between the first end 121 and second end 123 of the first adjustable tensioning assembly 120. In FIGS. 1-3, the first tension adjustment device 125 is located on the first adjustable tensioning assembly 120 toward the first end 121. In one or more examples of embodiments, the first tension adjustment device 125 may also be located toward the second end 123 of the first adjustable tensioning assembly 120. In one or more examples of embodiments, the first tension adjustment device 125 may be a cam buckle, bar slide, ladder lock buckle, tongue buckle or other adjustment device which may adjust the tension of the first adjustable tensioning assembly 120.

The bodily support assembly 101 may also include a second retention device or structure 130 which is substantially identical to the first retention device or structure 110. As shown in FIGS. 1 and 3, the second retention device or structure 130 may generally be positioned along the second side 105 of the bodily support assembly 101. The second retention device 130 generally forms a longitudinal passage or tunnel or pocket or channel along the second side 105 of the bodily support assembly 101. In one or more examples of embodiments, the second retention device or structure 130 may be formed separately from the bodily support assembly 101 and mounted or attached thereto. Further, in one or more examples of embodiments, the second retention device 130 may extend along a portion of the second side 105 of the bodily support assembly 101. However, it is contemplated that the second retention device 130 may extend the entire length or substantially the entire length of the bodily support assembly 110. The second retention device 130 may be formed of a similar material as the bodily support assembly 101. Additionally, the second retention device 130 may be formed of any other material, including, but not limited to a rigid material, such as steel or aluminum, or a textile with the strength to retain an adjustable tensioning device and support a portion of the adjustable suspension sleep device 100 during operation or use.

The second retention device or structure 130 may also include a first portion 131, a second portion 132, a first opening or aperture 133, and a second opening or aperture 134. As shown in FIGS. 1-3, the second retention device or structure 130 may have a first portion 131 which directly opposes the second portion 132 to form the passage or tunnel or pocket or channel therebetween. The first opening or aperture 133 is positioned toward the first end 106 of the bodily support assembly 101. The second opening or aperture 134 is positioned toward the second end 107 of the bodily support assembly 101 and positioned a distance apart from the first opening or aperture 133. The first opening or aperture 133 and second opening or aperture 134 may provide access to the passage or tunnel or pocket or channel of the second retention device or structure 130.

The second retention device or structure 130 may also include a second adjustable tensioning assembly 140. As illustrated in FIGS. 1-3, the second adjustable tensioning assembly 140 may be a belt or strap generally formed of nylon, polyester, polypropylene or other animal, plant, mineral or synthetic textile with sufficient strength and flexibility to support a portion of the adjustable suspension sleep device 100 during operation or use. The second adjustable tensioning assembly 140 may have a first end 141 and a second end 143. Connected to the first end 141 of the second adjustable tensioning assembly 140 is a first attachment member 142. Connected to the second end 143 of the second adjustable tensioning assembly 140 is a second attachment member 144. The first and second attachment members 142, 144 generally may be S-hooks. In one or more examples of embodiments, the first and second attachment members 142, 144 may be formed of metal or plastic. Further, in one or more examples of embodiments, the first and second attachment members 142, 144 may be a bolt snap, snap hook, carabiner, trigger snap, Velcro®, or other type of hook or connector.

The second adjustable tensioning assembly 140 may also include a second tension adjustment device 145. As shown in FIGS. 1 and 3, the second tension adjustment device 145 may be a ratchet buckle and may be located between the first end 131 and second end 133 of the second adjustable tensioning assembly 130. In FIGS. 1-3, the second tension adjustment device 145 is located on the second adjustable tensioning assembly 140 toward the first end 121. In one or more examples of embodiments, the second tension adjustment device 145 may also be located toward the second end 123 of the second adjustable tensioning assembly 140. In one or more examples of embodiments, the second tension adjustment device 145 may be a cam buckle, bar slide, ladder lock buckle, tongue buckle or other adjustment device which may adjust the tension of the second adjustable tensioning assembly 140.

The bodily support assembly 101 may also include a first suspension support assembly 150 and a second suspension support assembly 160. As shown in FIGS. 1 and 3, the first suspension support assembly 150 may generally be positioned along the first end 106 of the bodily support assembly 101. The second suspension support assembly 160 may generally be positioned along the second end 107 of the bodily support assembly 101. When positioned or attached or installed to the bodily support assembly 101, the first and second suspension support assemblies 150, 160 may be aligned generally perpendicularly to the first and second retention device or structure 110, 130. The first and second suspension support assemblies 150, 160 in the illustrated example are members which may be cylindrical or tubular in shape and may be hollow or have a passage or channel 152, 162. However, alternative geometries and/or dimensions would not depart from the overall scope of the present invention. Likewise, in one or more examples of embodiments, the first and second suspension support assemblies 150, 160 may be solid. The first and second suspension support assemblies 150, 160 preferably may be formed of polyvinyl chloride (PVC). In one or more examples of embodiments, the first and second suspension support assemblies 150, 160 may alternatively be formed of other materials, including, but not limited to, steel, aluminum, other metals, or composite materials with the strength to support a portion of the adjustable suspension sleep device 100 during operation or use.

The first suspension support assembly 150 may be removably attached to the bodily support assembly 101 by a first suspension support retention device or structure 151. As illustrated in FIGS. 1 and 3, the first suspension support retention device or structure 151 generally forms a passage or tunnel or pocket or channel 153 along the first end 106 of the bodily support assembly 101. The first suspension support retention device 151 preferably may have a radius or size slightly larger than the radius of the first suspension support assembly 150, enabling the first suspension support retention device 151 to removably receive the first suspension support assembly 150 within the channel 153.

The second suspension support assembly 160 may be similarly removably attached to the bodily support assembly 101 by a second suspension support retention device or structure 161. As illustrated in FIGS. 1 and 3, the second suspension support retention device or structure 161 generally forms a passage or tunnel or pocket or channel 163 along the second end 107 of the bodily support assembly 101. The second suspension support retention device 161 preferably may have a radius or size slightly larger than the radius of the second suspension support assembly 160, enabling the second suspension support retention device 161 to removably receive the second suspension support assembly 160 within the channel 163.

The bodily support assembly 101 may also include pocket 170. As shown in FIGS. 1 and 3, the pocket 170 may be positioned near the second end 107 of the bodily support assembly 101. The pocket 170 may extend across the bodily support assembly 101 from the first retention device 110 to the second retention device 130. The pocket 170 may also extend a variety of distances between the first end 106 and second end 107 of the bodily support assembly 101. The pocket 170 is generally formed of material similar to the bodily support assembly 101.

The pocket 170 may also optionally include an attached blanket 171. As illustrated in FIG. 3, a portion of a blanket 171 may be attached to the pocket 170. This enables the blanket 171 to be stored in the pocket 170 without risk of loss, as the blanket 171 is attached to the bodily support assembly 101. The blanket 171 may be formed of fleece, wool, polypropylene, or any other animal, plant, mineral, or synthetic textile sufficient to provide warmth for a user.

Figure 6:
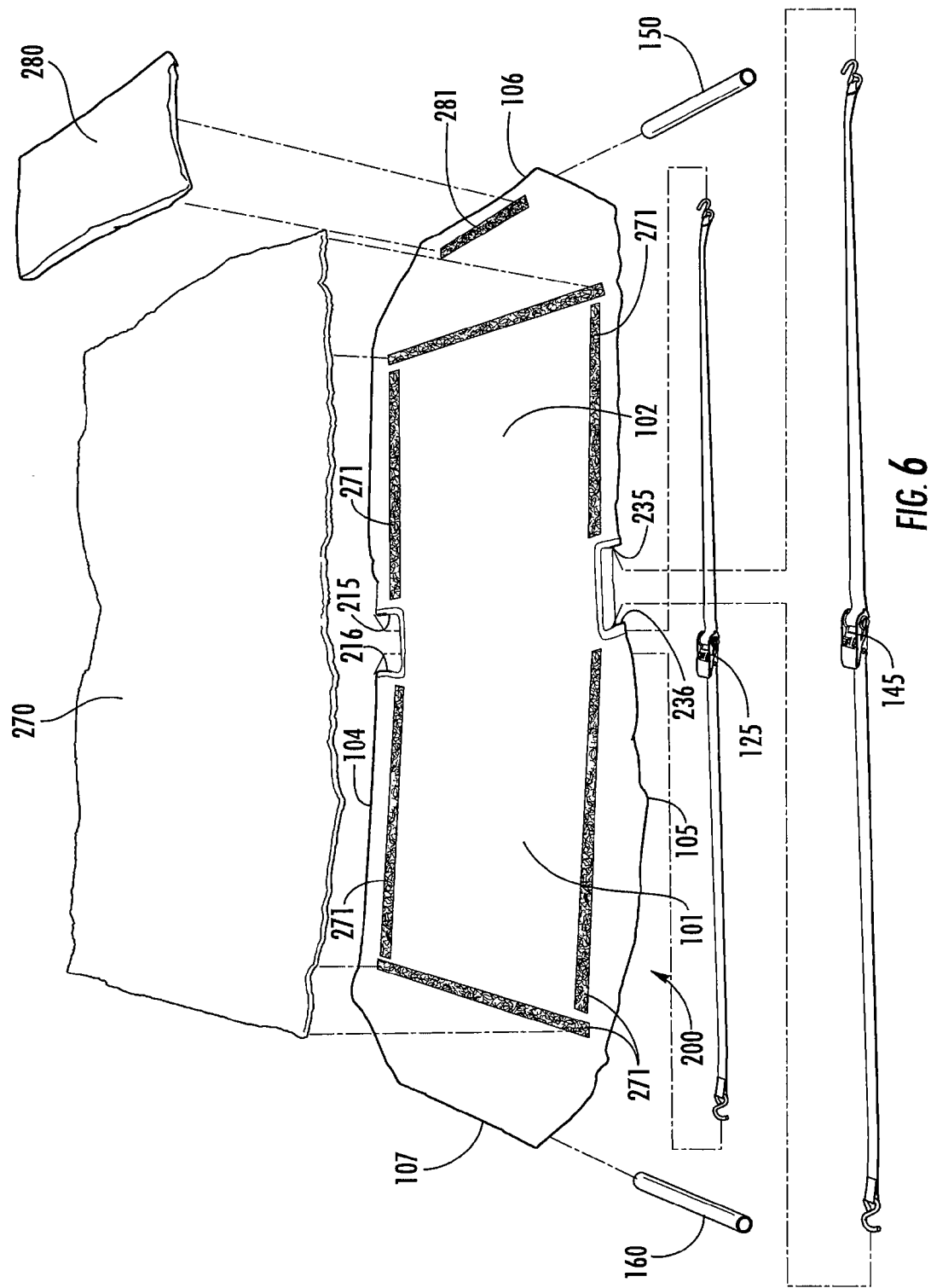
FIG. 6 is an exploded view of the adjustable suspension sleep device shown in FIG. 4.

FIGS. 4-6 illustrate an alternative embodiment of an adjustable suspension sleep device 200 in accordance with one or more examples of embodiments of the present invention. The alternative embodiment of the adjustable suspension sleep device 200 is substantially similar to adjustable suspension sleep device 100 described above and like numbers have been used to describe like components. To this end, adjustable suspension sleep device 200 may include a bodily support assembly 101, a front of face side 102, a back or rear side 103, a first side 104, a second side 105, a first end 106, a second end 107, a first adjustable tensioning assembly 120, a second adjustable tensioning assembly 140, a first tensioning adjustment device 125, and a second tensioning adjustment device 145.

However, as illustrated in FIG. 5, the adjustable suspension sleep device 200 may include an alternative embodiment of a first retention device or structure 210 and a second retention device or structure 230 in accordance with one or more examples of embodiments of the present invention. The first retention device or structure 210 may generally be positioned along the first side 104 of the bodily support assembly 101 of the adjustable suspension sleep device 200. The first retention device 210 generally forms a longitudinal passage or tunnel or pocket or channel along the first side 104 of the bodily support assembly 101. The first retention device 210 may include a first opening or aperture 213, a second opening or aperture 214, a third opening or aperture 215, and a fourth opening or aperture 216. The first opening or aperture 213 may generally be positioned toward the first end 106 side of the first retention device 210. The second opening or aperture 214 may generally be positioned toward the second end 107 side of the first retention device 210. A distance along the first retention device 210 moving from the first end 106 side to the second end 107 side may be a third opening or aperture 215. A distance from the third opening or aperture 215 toward the second end 107 side of the first retention device 210, and generally facing the third opening or aperture 215, may be a fourth opening or aperture 216. The third and fourth openings or apertures 215, 216 provide an open area or cavity or chamber within the first retention device 210 to expose the first tension adjustment device 125 of the first adjustable tensioning assembly 120 between the first and second apertures 213, 214. In one or more examples of embodiments, the first retention device or structure 210 may be formed separately from the bodily support assembly 101 and mounted or attached thereto. Further, in one or more examples of embodiments, the first retention device or structure 210 may extend along a portion of the second side 105 of the bodily support assembly 101. However, it is contemplated that the first retention device or structure 210 may extend the entire length or substantially the entire length of the bodily support assembly 110. The first retention device or structure 210 may be formed of a similar material as the bodily support assembly 101. Additionally, the first retention device or structure 210 may be formed of any other material, including, but not limited to a rigid material, such as steel or aluminum, or a textile with the strength to retain an adjustable tensioning device and support a portion of the adjustable suspension sleep device 100 during operation or use.

Similarly, and also illustrated in FIG. 5, the second retention device or structure 230 may generally be positioned along the second side 105 of the bodily support assembly 101 of the adjustable suspension sleep device 200. The second retention device 230 generally forms a longitudinal passage or tunnel or pocket or channel along the second side 105 of the bodily support assembly 101. The second retention device 230 may include a first opening or aperture 233, a second opening or aperture 234, a third opening or aperture 235, and a fourth opening or aperture 236. The first opening or aperture 233 may generally be positioned toward the first end 106 side of the second retention device 230. The second opening or aperture 234 may generally be positioned toward the second end 107 side of the second retention device 230. A distance along the second retention device 230 moving from the first end 106 side to the second end 107 side may be a third opening or aperture 235. A distance from the third opening or aperture 235 toward the second end 107 side of the second retention device or structure 230, and generally facing the third opening or aperture 235, may be a fourth opening or aperture 236. The third and fourth openings or apertures 235, 236 provide an open area or cavity or chamber within the second retention device or structure 230 to expose the second tension adjustment device 145 of the second adjustable tensioning assembly 140 between the first and second apertures 233, 234. In one or more examples of embodiments, the second retention device or structure 230 may be formed separately from the bodily support assembly 101 and mounted or attached thereto. Further, in one or more examples of embodiments, the second retention device or structure 230 may extend along a portion of the second side 105 of the bodily support assembly 101. However, it is contemplated that the second retention device or structure 230 may extend the entire length or substantially the entire length of the bodily support assembly 110. The second retention device or structure 230 may be formed of a similar material as the bodily support assembly 101. Additionally, the second retention device or structure 230 may be formed of any other material, including, but not limited to a rigid material, such as steel or aluminum, or a textile with the strength to retain an adjustable tensioning device and support a portion of the adjustable suspension sleep device 100 during operation or use.

The adjustable suspension sleep device 200 may also include a bodily support assembly casing or cover 270. As illustrated in FIGS. 4 and 6, the casing or cover 270 may be attached to the bodily support assembly 101. The casing or cover 270 generally may be configured to substantially cover the bodily support assembly 101 or may cover a portion thereof. Further, the casing or cover 270 may be removable from the bodily support assembly 101. As illustrated in FIG. 6, the casing or cover 270 may be attached to the bodily support assembly 101 by a casing or cover attachment device 271. The casing or cover attachment device 271 shown in FIG. 6 generally surrounds the perimeter of the casing or cover 270 to ensure attachment to the bodily support assembly 101. As shown in FIG. 6, the casing or cover attachment device 271 may be semi-permanent, such as through the use of Velcro®. Specifically, the "hook" side of the Velcro® is attached around the perimeter of casing or cover 270. The "loop" side of the Velcro® is correspondingly attached around the perimeter of bodily support assembly 101. The "hook" and "loop" sides join to form the semi-permanent casing or cover attachment device 271. In one or more examples of embodiments, the casing or cover attachment device 271 may be permanent, such as through the use of stitching or sewing. Further, in one or more examples of embodiments, the casing or cover 270 may be integrally formed into the bodily support assembly 101. The casing or cover 270 may be formed of fleece, vellux, wool, cotton, or any other animal, plant, mineral, or synthetic textile.

The adjustable suspension sleep device 200 may also optionally include a head support device or pillow 280. As illustrated in FIGS. 4 and 6, the head support device or pillow 280 may be attached toward the first end 106 of the bodily support assembly 101. The head support device or pillow 280 may be optionally attached to the bodily support assembly 101 by attachment device 281. The attachment device 281 may be semi-permanent, such as through the use of Velcro®, as shown in FIG. 6. In one or more examples of embodiments, the attachment device 281 may be permanent, such as through the use of stitching or sewing. Further, in one or more examples of embodiments, the head support device or pillow 280 may be attached toward the second end 107 of the bodily support assembly 101.

The first retention device 110, as illustrated in FIGS. 1-3, may be integrally formed within the bodily support assembly 101. The first retention device 110 is integrally formed by taking an edge of material along the first side 104 of the bodily support assembly 101 and folding the edge of material toward the second side 105 of the bodily support assembly 101. The edge of the material may then be attached to the bodily support assembly 101, for example by sewing, to create the first retention device or structure 110. The edge of the material may be folded onto the front side 102 of the bodily support assembly 101 prior to attachment. In one or more examples of embodiments, and as illustrated in FIG. 5, the edge of the material may be folded onto the back side 103 of the bodily support assembly 101 prior to attachment. In one or more examples of embodiments, the first retention device or structure 110 may be formed separately from the bodily support assembly 101 and attached thereto.

As illustrated in FIGS. 1 and 3, the first retention device 110 may removably receive the first adjustable tensioning assembly 120. The first adjustable tensioning assembly 120 may be completely removable from the first retention device 110 to enable inspection and routine maintenance of the first adjustable tensioning assembly 120 and to enable laundering of the bodily support assembly 101. However, the first adjustable tensioning assembly 120 may be attached to or integrally formed with the bodily support assembly 101. As shown in FIG. 3, the first opening or aperture 113 of the first retention device 110 may removably receive the second end 123 of the first adjustable tensioning assembly 120. The second end 123 of the first adjustable tensioning assembly 120 is then moved through the passage or tunnel or pocket or channel formed between the first portion 111 and second portion 112 of the first retention device 110 toward the second opening or aperture 114. Once the second end 123 of the first adjustable tensioning assembly 120 passes through the second opening or aperture 114, the first adjustable tensioning assembly 120 is removably received by the first retention device 110.

The second retention device 130, as illustrated in FIGS. 1-3, may be integrally formed within the bodily support assembly 101. The second retention device 130 is integrally formed by taking an edge of material along the second side 105 of the bodily support assembly 101 and folding the edge of material toward the first side 104 of the bodily support assembly 101. The edge of the material may then be attached to the bodily support assembly 101, for example by sewing, to create the second retention device or structure 130. The edge of the material may be folded onto the front side 102 of the bodily support assembly 101 prior to attachment. In one or more examples of embodiments, and as illustrated in FIG. 5, the edge of the material may be folded onto the back side 103 of the bodily support assembly 101 prior to attachment. In one or more examples of embodiments, the second retention device or structure 130 may be formed separately from the bodily support assembly 101 and attached thereto.

As illustrated in FIGS. 1 and 3, the second retention device 130 may removably receive the second adjustable tensioning assembly 140. The second adjustable tensioning assembly 140 may be completely removable from the second retention device 130 to enable inspection and routine maintenance of the second adjustable tensioning assembly 140 and to enable laundering of the bodily support assembly 101. However, the second adjustable tensioning assembly 140 may be attached to or integrally formed with the bodily support assembly 101. As shown in FIG. 3, the first opening or aperture 133 of the second retention device 130 may removably receive the second end 143 of the second adjustable tensioning assembly 140. The second end 143 of the second adjustable tensioning assembly 140 is then moved through the passage or tunnel or pocket or channel formed between the first portion 131 and second portion 132 of the second retention device 130 toward the second opening or aperture 134. Once the second end 143 of the second adjustable tensioning assembly 140 passes through the second opening or aperture 134, the second adjustable tensioning assembly 140 is removably received by the second retention device 130.

The first suspension support assembly 150 may be removed from the first suspension support retention device 151 to enable laundering of the bodily support assembly 101. The first suspension support retention device or structure 151 may be integrally formed by taking an edge of material along the first end 106 of the bodily support assembly 101 and folding the edge of material toward the second end 107 of the bodily support assembly 101. The edge of the material may then be attached to the bodily support assembly 101, for example by sewing, to create the passage or tunnel or pocket or channel 153 of the first suspension support retention device or structure 151. As illustrated in FIGS. 1 and 3, the edge of the material may be folded onto the front side 102 of the bodily support assembly 101 prior to attachment. In one or more examples of embodiments, and as illustrated in FIG. 5, the edge of the material may be folded onto the back side 103 of the bodily support assembly 101 prior to attachment. Further, in one or more examples of embodiments, the first suspension support retention device or structure 151 may be formed separately from the bodily support assembly 101 and attached thereto.

The second suspension support assembly 160 may be removed from the second suspension support retention device 161 to enable laundering of the bodily support assembly 101. The second suspension support retention device or structure 161 may be integrally formed by taking an edge of material along the second end 107 of the bodily support assembly 101 and folding the edge of material toward the first end 106 of the bodily support assembly 101. The edge of the material may then be attached to the bodily support assembly 101, for example by sewing, to create the passage or tunnel or pocket or channel 163 of the second suspension support retention device or structure 161. As illustrated in FIGS. 1 and 3, the edge of the material may be folded onto the front side 102 of the bodily support assembly 101 prior to attachment. In one or more examples of embodiments, and as illustrated in FIG. 5, the edge of the material may be folded onto the back side 103 of the bodily support assembly 101 prior to attachment. Further, in one or more examples of embodiments, the second suspension support retention device or structure 161 may be formed separately from the bodily support assembly 101 and attached thereto.

As illustrated in FIGS. 1 and 3, the pocket 170 may be formed by sewing all sides except for the side closest to the first end 106 of the bodily support assembly 101. The pocket 170 may be used in a variety of ways. A user may use the pocket 170 to store an unattached blanket or an unattached pillow during storage of the bodily support assembly 101. Further, the user may use the pocket 170 to place feet, legs or other extremities within during operation and use of the adjustable suspension sleep device 100.

As illustrated in FIGS. 1 and 3, the blanket 171 may be permanently attached to the pocket 170 by sewing or stitching. The blanket 171 may be used in a variety of ways. A user may choose to remove the blanket 171 from the pocket 170, using the blanket for warmth during operation of the adjustable suspension sleep device 100. The user may instead choose to keep the blanket 171 within the pocket 170, using the combination as a pillow or head support during operation of the adjustable suspension sleep device 100.

Figure 7:
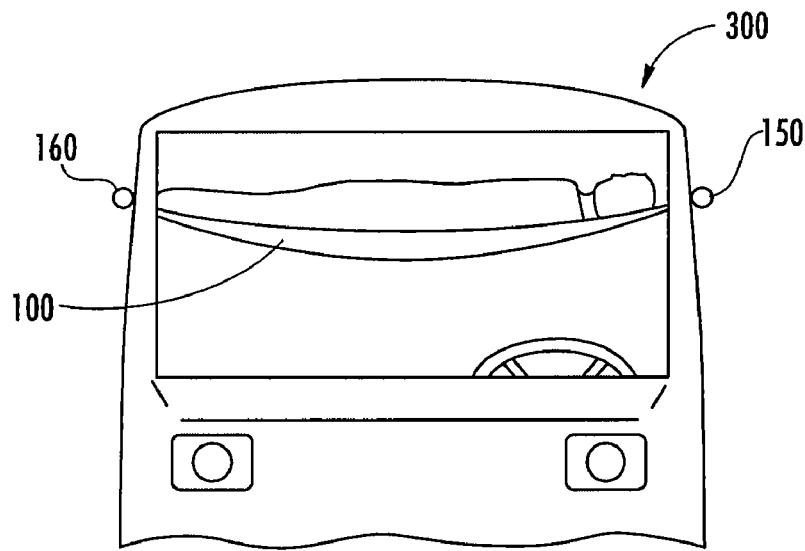
FIG. 7 is a partial elevation view of one or more examples of embodiments of an adjustable suspension sleep device, illustrating the device suspended inside of a vehicle.

FIG. 7 illustrates an adjustable suspension sleep device 100 in one or more examples of operation and use. The adjustable suspension sleep device 100 is suspended within a vehicle 300, and more specifically within the cab or passenger compartment of the vehicle 300. While device 100 is specifically illustrated, device 200 may be substituted for the discussion herein without departing from the scope of the present invention.

Figure 8:
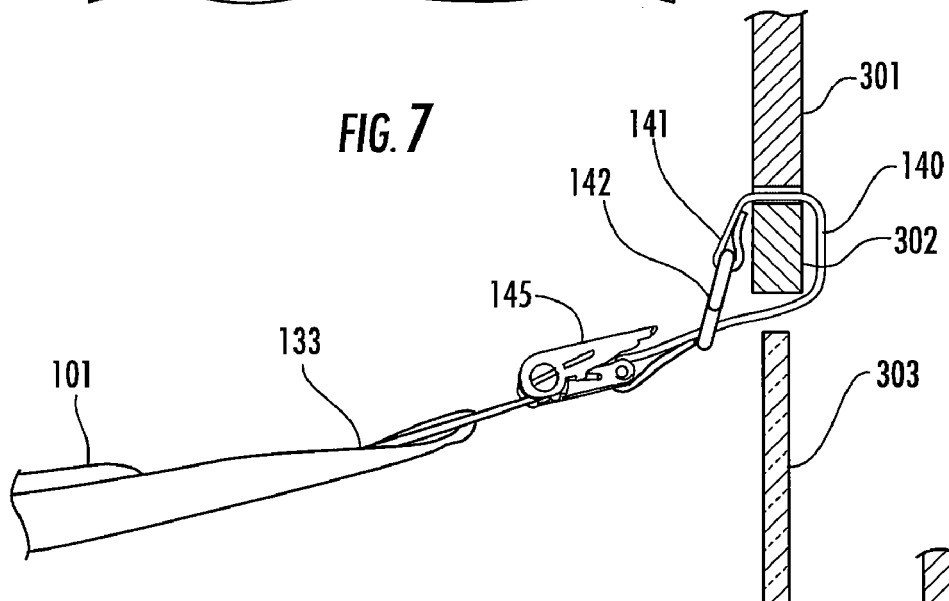
FIG. 8 is a partial side elevation view of the adjustable suspension sleep device mounted in a vehicle including a portion of the first end of an adjustable suspension sleep device according to the embodiment of FIG. 1 installed thereon, the vehicle being shown in partial cross-section.
Figure 9:
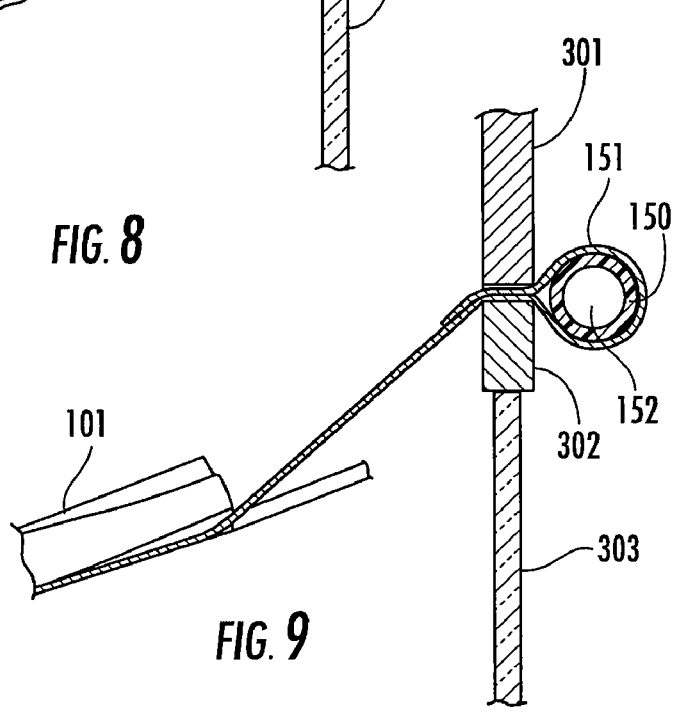
FIG. 9 is a partial side elevation view of the adjustable suspension sleep device mounted in a vehicle including a portion of the first end of an adjustable suspension sleep device as shown in FIG. 7, the vehicle being shown in partial cross-section.

In operation and use the sleep device 100 may be provided in a horizontal position, as best illustrated in FIG. 7. A user will begin by winding down a portion of the first vehicle door window 303. The user will then open the associated first vehicle door 302. Referring to FIG. 8, the user will then move the first attachment member 142 of the second adjustable tensioning assembly 140 from the cab or passenger compartment of the vehicle 300 outside through the opening created between the first vehicle door 302 and first vehicle door window 303. The user will then move the first attachment member 142 of the second adjustable tensioning assembly 140 around the frame of the first vehicle door 302 and back into the cab or passenger compartment of the vehicle 300, effectively wrapping the second adjustable tensioning assembly 140 around the frame of the first vehicle door 302. The user will then engage the first attachment member 142 with the second adjustable tensioning assembly 140, creating a loop around the frame of first vehicle door 302. Though not pictured in the Figures, the user will take the same steps to attach the first attachment member 122 of the first adjustable tensioning assembly 120. The user will move the first attachment member 122 of the first adjustable tensioning assembly 120 from the cab or passenger compartment of the vehicle 300 outside through the opening created between the first vehicle door 302 and first vehicle door window 303. The user will then move the first attachment member 122 of the first adjustable tensioning assembly 120 around the frame of the first vehicle door 302 and back into the cab or passenger compartment of the vehicle 300, effectively wrapping the first adjustable tensioning assembly 122 around the frame of the first vehicle door 302. The user will then engage the first attachment member 122 with the first adjustable tensioning assembly 120, creating a second loop around the frame of first vehicle door 302. Once both of the first and second adjustable tensioning assemblies 120, 140 form loops around the frame of first vehicle door 302, the user winds up the first vehicle door window 303. The user will then place the first suspension support assembly 150 and first suspension support retention device or structure 151 between the first vehicle frame 301 and first vehicle door 302, as illustrated in FIG. 9. The user will then shut the first vehicle door 302, engaging the first suspension support assembly 150 with the vehicle 300 by effectively trapping the material forming the first suspension support retention device or structure 151 between the first vehicle frame 301 and first vehicle door 302. The first suspension support assembly 150 remains outside of the vehicle 300. In this position, the first end 106 of the adjustable suspension sleep device 100 is attached or engaged with the first side of the vehicle 300.

Figure 10:
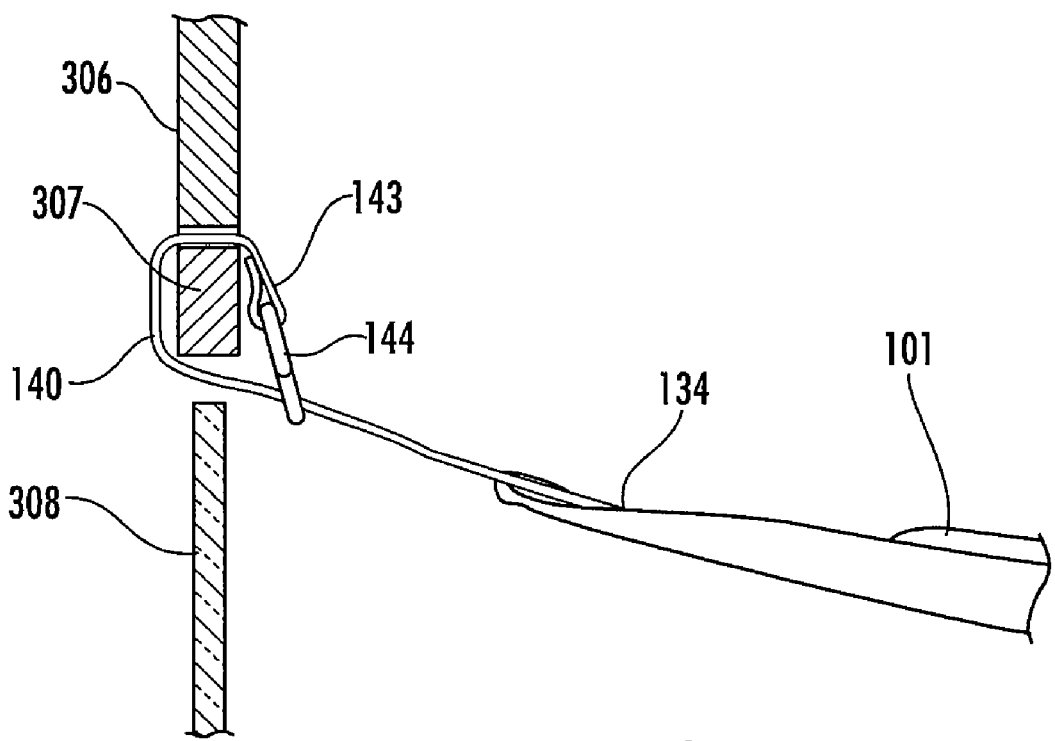
FIG. 10 is a partial side elevation view of the adjustable suspension sleep device mounted in a vehicle including a portion of the second end of an adjustable suspension sleep device according to the embodiment of FIG. 1 installed thereon, the vehicle being shown in partial cross-section.
Figure 11:
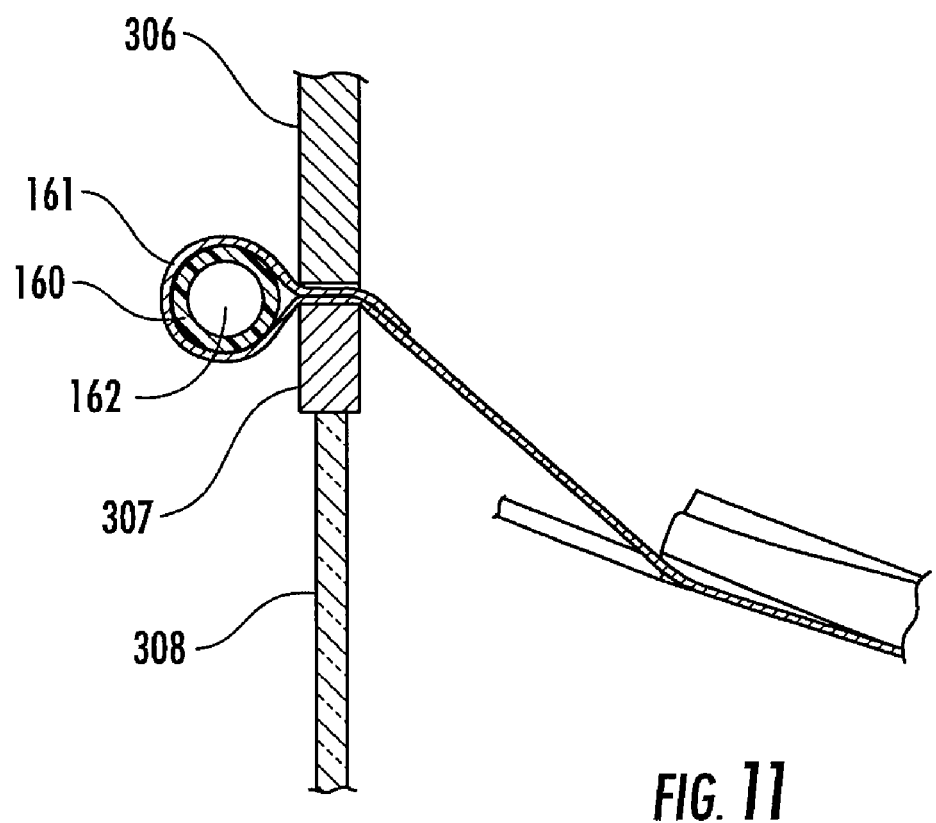
FIG. 11 is a partial side elevation view of the adjustable suspension sleep device mounted in a vehicle including a portion of the second end of an adjustable suspension sleep device as shown in FIG. 7, the vehicle being shown in partial cross-section.

A user then moves to the second side of the vehicle to attach the second end 107 of the adjustable suspension sleep device 100. The user will wind down a portion of the second vehicle door window 308. The user will then open the associated second vehicle door 307. Referring to FIG. 10, the user will then move the second attachment member 144 of the second adjustable tensioning assembly 140 from the cab or passenger compartment of the vehicle 300 outside through the opening created between the second vehicle door 307 and second vehicle door window 308. The user will then move the second attachment member 144 of the second adjustable tensioning assembly 140 around the frame of the second vehicle door 307 and back into the cab or passenger compartment of the vehicle 300, effectively wrapping the second adjustable tensioning assembly 140 around the frame of the second vehicle door 307. The user will then engage the second attachment member 144 with the second adjustable tensioning assembly 140, creating a loop around the frame of second vehicle door 307. Though not pictured in the Figures, the user will take the same steps to attach the second attachment member 124 of the first adjustable tensioning assembly 120. The user will move the second attachment member 124 of the first adjustable tensioning assembly 120 from the cab or passenger compartment of the vehicle 300 outside through the opening created between the second vehicle door 307 and second vehicle door window 308. The user will then move the second attachment member 124 of the first adjustable tensioning assembly 120 around the frame of the second vehicle door 307 and back into the cab or passenger compartment of the vehicle 300, effectively wrapping the first adjustable tensioning assembly 120 around the frame of the second vehicle door 307. The user will then engage the second attachment member 124 with the first adjustable tensioning assembly 120, creating a second loop around the frame of second vehicle door 307. Once both of the first and second adjustable tensioning assemblies 120, 140 form loops around the frame of second vehicle door 307, the user winds up the second vehicle door window 308. The user will then place the second suspension support assembly 160 and second suspension support retention device or structure 161 between the second vehicle frame 306 and second vehicle door 307, as illustrated in FIG. 11. The user will then shut the second vehicle door 307, engaging the second suspension support assembly 160 with the vehicle 300 by effectively trapping the material forming the second suspension support retention device or structure 161 between the second vehicle frame 306 and second vehicle door 307. The second suspension support assembly 160 remains outside of the vehicle 300. In this position, the second end 107 of the adjustable suspension sleep device 100 is engaged with the second side of the vehicle 300.

A user then enters into the bodily support assembly 101 of the adjustable suspension sleep device 100. The user begins to adjust the tension of the first and second adjustable tensioning assemblies 120, 140 by adjusting the tension adjustment devices 125, 145. By adjusting the tension adjustment devices 125, 145, the first and second adjustable tensioning assemblies 120, 140 being to tighten, both suspending the adjustable suspension sleep device 100 in the air and creating a cocoon-like structure around the user. The cocoon-like structure reduces the risk of the user falling out of the adjustable suspension sleep device 100 as the first and second adjustable tensioning assemblies 120, 140 are positioned above the user. The aerial suspension of the adjustable suspension sleep device 100 enable the user to comfortably extend their body while they sleep. The user continues to adjust the tension adjustment devices 125, 145 until the adjustable suspension sleep device 100 is adequately suspended in the air and the user is comfortable.

The user may then disengage the adjustable suspension sleep device 100 by reversing the steps to engage the device 100. The user begins by adjusting the tension adjustment devices 125, 145 to decrease the tension in the first and second adjustable tensioning assemblies 120, 140 until the adjustable suspension sleep device 100 no longer is in the air, eliminating the cocoon-like structure around the user. The user may then remove himself or herself from the adjustable suspension sleep device 100. The user may then open either the first or second vehicle door 302, 307 and remove the associated first or second suspension support assembly 150, 160 and first or second suspension support retention device 151, 161. The user will then wind down a portion of the first or second vehicle door window 303, 308, disengage first attachment members 122, 142 or second attachment members 124, 144 from the first and second adjustable tensioning assemblies 120, 140, and remove the corresponding loop around the first or second vehicle door frame 302, 307 by moving the first attachment members 122, 142 or second attachment members 124, 144 between the first or second vehicle frame 301, 306 and first or second vehicle door frame 302, 307, around the first or second vehicle door frame 302, 307 and into the cab or passenger compartment through the opening created between the first or second vehicle door frame 302, 307 and the first or second vehicle door window 303, 308. The user will then repeat disengagement of the other end of the adjustable suspension sleep device 100 from the other side of the vehicle 300, specifically the second or first vehicle door 307, 302. Once the adjustable suspension sleep device 100 is completely removed or disengaged from the vehicle 300, the adjustable suspension sleep device 100 may be rolled and stored in a provided storage bag (not pictured) until needed at a later time.

Figure 12A:
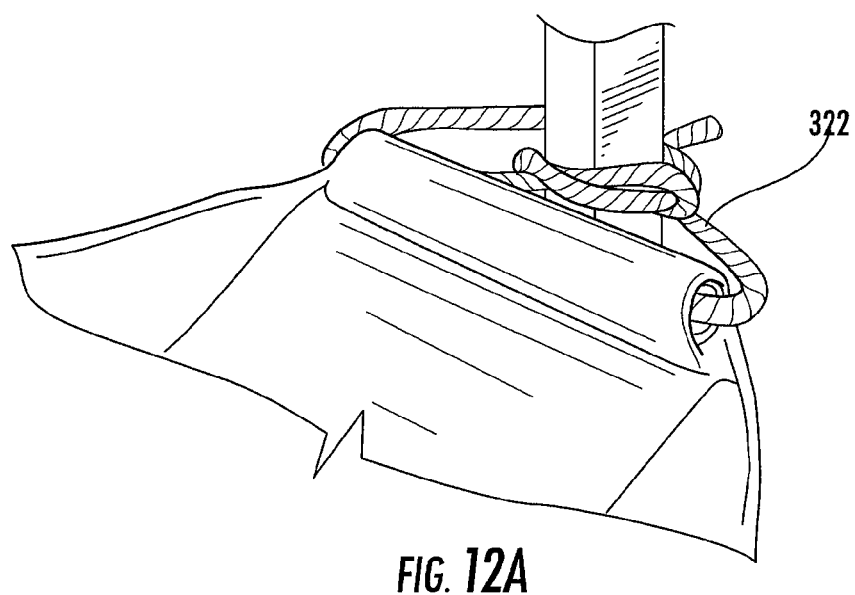
FIG. 12A is an enhanced isometric view of an end of an adjustable suspension sleep device according to the embodiment of FIG. 12.

FIG. 12 illustrates the one or more examples of embodiments of the adjustable suspension sleep device 100 in operation and use in an alternative environment. The adjustable suspension sleep device 100 is suspended within a trailer 320, and more specifically a horse trailer. As illustrated in FIG. 12, the first and second adjustable tensioning assemblies 120, 140 engage the trailer 320 in a similar manner as the vehicle 300 shown in FIGS. 8 and 10. However, the first and second suspension support assemblies 150, 160 engage or attach to the trailer 320 in a different manner. As illustrated in FIGS. 12 and 12A, the first and second suspension support assemblies 150, 160 may engage or attach to the trailer 320 through manual suspension support assembly attachment devices 322. The manual suspension support assembly attachment device 322 may be a rope. Each manual suspension support assembly attachment device 322 is placed through the passage or channel 152, 162 of the first and second suspension support assemblies 150, 160, respectively. Each manual suspension support assembly attachment device 322 is then connected or engaged or attached to the frame of trailer 320. As shown in FIG. 12A, the manual suspension support assembly attachment device 322 is wrapped around frame elements of supports of the trailer 320, and then the manual suspension support assembly attachment device 322 is tied together. In one or more examples of embodiments, manual suspension support assembly attachment device 322 may be a belt, a chain, a strap or other rope like structure generally formed of nylon, polyester, polypropylene or other animal, plant, mineral or synthetic textile.

FIG. 13 illustrates the one or more examples of embodiments of the adjustable suspension sleep device 100 in operation and use in an alternative environment. The adjustable suspension sleep device 100 is suspended within a stand or free standing frame assembly 325. As illustrated in FIG. 13, the stand or free standing frame assembly 325 may include a series of interconnecting pipes, preferably formed of PVC. The stand or free standing frame assembly 325 may include a first end 326 and a second end 327. The stand or free standing frame assembly 325 may be adapted to removably receive the first suspension support assembly 150 and the second suspension support assembly 160. The first end 326 of the stand 325 may have a first suspension support assembly connector or receiver 328 and a second suspension support assembly connector or receiver 329. Similarly, the second end 327 of the stand 325 may have a third suspension support assembly connector or receiver 330 and a fourth suspension support assembly connector or receiver 331. As illustrated in FIG. 13, the first, second, third and fourth suspension support assembly connectors or receivers 328, 329, 330, 331 are PVC T-shaped connections. A first end of the first suspension support assembly 150 connects or mates with the first suspension support assembly connector or receiver 328, while the second end of the first suspension support assembly 150 connects or mates with the second suspension support assembly connector or receiver 329. A first end of the second suspension support assembly 160 connects or mates with the third suspension support assembly connector or receiver 330, while the second end of the second suspension support assembly 160 connects or mates with the fourth suspension support assembly connector or receiver 331. Once the first and second suspension support assemblies 150, 160 are attached, incorporated, or removably received by the stand or free standing frame assembly 325, the adjustable suspension sleep device 100 may be used. In one or more examples of embodiments, the stand or free standing frame assembly 325 may be formed of other materials, including, but not limited to, steel, aluminum, other metals, or composite materials with the strength to support the adjustable suspension sleep device 100 during operation or use.

In comparison to currently known references, the adjustable suspension sleep device 100, 200 has several structural advantages. The adjustable suspension sleep device 100, 200 provides three points of connection with the attached vehicle or structure on both the first and second ends 106, 107 of the adjustable suspension sleep device 100, 200. Specifically, the first attachment members 121, 141 of the first and second adjustable tensioning assemblies 120, 140 and the first suspension support assembly 150 provide three connection points to the attached vehicle or structure on the first side 106 of the adjustable suspension sleep device 100, 200. The second attachment members 124, 144 and the second suspension support assembly 160 provide three connection points to the attached vehicle or structure on the second side 107 of the adjustable suspension sleep device 100, 200. Further, the first and second adjustable tensioning assemblies 120, 140 reduces the risk of a user from falling out of the adjustable suspension sleep device 100, 200. Specifically, when tension is applied to the first and second adjustable tensioning assemblies 120, 140 and the adjustable suspension sleep device 100, 200 is suspended above the ground or other surface, the first and second adjustable tensioning assemblies 120, 140 are generally positioned above the body of the user. Accordingly, the bodily support assembly 101 wraps around and encloses the body of the user within the adjustable suspension sleep device 100, 200, generally forming a "U-shape" when viewed from the first end 106 toward the second end 107 (or the second end 107 toward the first end 106) of the adjustable suspension sleep device 100, 200. Since the first and second sides 104, 105 of the bodily support assembly 101 are also positioned generally above the body of the user (based upon the positioning of the first and second adjustable tensioning assemblies 120, 140), the bodily support assembly 101 generally forms a cocoon-like structure or partial cocoon around the body of the user. The risk of falling out of the adjustable suspension sleep device 100, 200 is reduced because the first and second sides 104, 105 are positioned above the body of the user. In order to fall out of the adjustable suspension sleep device 100, 200, the user has to move upward and over one of the first or second sides 104, 105. An additional structural advantage is the combination of the first and second adjustable tensioning assemblies 120, 140 and the bodily support assembly 101 accounting for different heights or lengths or users. When tension is applied to the first and second adjustable tensioning assemblies 120, 140 and the adjustable suspension sleep device 100, 200 is suspended above the ground or other surface, the bodily support assembly 101 supports the body of a user. The bodily support assembly 101 hangs downward, toward the ground or other surface, from the first and second ends 106, 107. The body of the user (in addition to gravity) generates downward force against the bodily support assembly 101, creating a downward hang or sag between the first and second ends 106, 107. This downward hang or sag naturally supports the entire length or height of the body of the user. This effectively allows the user to comfortably hang or be suspended during sleep. The amount of hang or sag may increase or decrease based upon the length or height (or weight) of the user. Accordingly, the bodily support assembly 101 may provide comfortable bodily support for users of different heights or lengths.

The adjustable suspension sleep device described herein has several advantages. For instance, the user may minimize exposure to extreme weather or the elements by setting up the adjustable suspension sleep device within the cab or passenger compartment of the vehicle. Likewise, the user will be protected by extreme weather while sleeping, especially low temperatures, by the cocoon-like structure around the user and use within the cab or passenger compartment of the vehicle. The user may have the added benefit of additional warmth from at least one of a pocket 170, blanket 171 and a casing or cover 270. This benefits a user who may require sleep or has a disabled vehicle while experiencing low temperatures which could lead to hypothermia and death. Additionally, during operation and use of the adjustable suspension sleep device, the user is suspended in the air in the cocoon-like structure, allowing the user to comfortably hang or be suspended during sleep, accounting for different heights or lengths or users. Further, the cocoon-like structure ensures the user will not fall out of the adjustable suspension sleep device and cause an injury, as the first and second adjustable tensioning assemblies 120, 140 are located above the user during use of the adjustable suspension sleep device.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to one or more examples of embodiments outlined above, various alternatives, modifications, variations, improvements and/or substantial equivalents, whether known or that are or may be presently foreseen, may become apparent to those having at least ordinary skill in the art. Accordingly, the one or more examples of embodiments of the invention, as set forth above, are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. An adjustable suspension sleep device for suspending a person within a vehicle, the adjustable suspension sleep device comprising:
    a body support assembly having a first and second longitudinally extending sides spaced apart by first and second ends, a front side and a back side;
    a first adjustable tensioning assembly having a first end, a second end, a first attachment member and a second attachment member, the first end of the first adjustable tensioning assembly in communication with the first attachment member and the second end of the first adjustable tensioning assembly in communication with the second attachment member;
    a second adjustable tensioning assembly having a first end, a second end, a third attachment member and a fourth attachment member, the first end of the second adjustable tensioning assembly in communication with the third attachment member and the second end of the second adjustable tensioning assembly in communication with the fourth attachment member;
    the first adjustable tensioning assembly is in communication with the first longitudinally extending side of the body support assembly;
    the second adjustable tensioning assembly is in communication with the second longitudinally extending side of the body support assembly;
    the first adjustable tensioning assembly is arranged generally parallel to the second adjustable tensioning assembly;
    a first suspension support assembly in communication with the first end of the body support assembly;
    a second suspension support assembly in communication with the second end of the body support assembly; and
    wherein upon receipt of a body of a person within the body support assembly, the first and second longitudinally extending sides are each positioned above the body of the person.

2. The adjustable suspension sleep device of claim 1, wherein:
    the first adjustable tensioning assembly has a first tension adjustment device; and
    the second adjustable tensioning assembly has a second tension adjustment device.

3. The adjustable suspension sleep device of claim 2, wherein the first and second tension adjustment device is a ratchet buckle.

4. The adjustable suspension sleep device of claim 2, wherein the first, second, third and fourth attachment members are hooks.

5. The adjustable suspension sleep device of claim 1, wherein:
    the first suspension support assembly has a first tubular member; and
    the second suspension support assembly has a second tubular member.

6. The adjustable suspension sleep device of claim 5 wherein the first tubular member and second tubular member are hollow.

7. The adjustable suspension sleep device of claim 1, further comprising at least one of a pocket, a blanket, a pillow, and a casing.

8. The adjustable suspension sleep device of claim 1, further comprising:
    a first retention device connected to the first longitudinally extending side of the body support assembly; and
    a second retention device connected to the second longitudinally extending side of the body support assembly.

9. The adjustable suspension sleep device of claim 8, wherein:
    the first adjustable tensioning assembly is removably received by the first retention device; and
    the second adjustable tensioning assembly is removably received by the second retention device.

10. An adjustable suspension sleep device comprising:
    a body support assembly having a first and second longitudinally extending sides spaced apart by first and second ends, a front side and a back side;
    a first adjustable tensioning assembly coupled to the entire first longitudinally extending side of the body support assembly;
    a first end of the first adjustable tensioning assembly in self-connecting engagement with a first segment of a first portion of a structure, the first adjustable tensioning assembly partially wraps around the first segment of the first portion of the structure, the first end subsequently engaging the first adjustable tensioning assembly;
    a second end of the first adjustable tensioning assembly in self-connecting engagement with a first segment of a second portion of a structure, the first adjustable tensioning assembly partially wraps around the first segment of the second portion of the structure, the second end subsequently engaging the first adjustable tensioning assembly;
    a second adjustable tensioning assembly coupled to the entire second longitudinally extending side of the body support assembly, the first and second adjustable tensioning assemblies arranged in parallel to one another;
    a first end of the second adjustable tensioning assembly in self-connecting engagement with a second segment of a first portion of a structure, the second adjustable tensioning assembly partially wraps around the second segment of the first portion of the structure, the first end subsequently engaging the second adjustable tensioning assembly;
    a second end of the second adjustable tensioning assembly in self-connecting engagement with a second segment of a second portion of a structure, the second adjustable tensioning assembly partially wraps around the second segment of the second portion of the structure, the second end subsequently engaging the second adjustable tensioning assembly;
    a first suspension support assembly connected with the first end of the body support assembly, the first suspension support assembly in communication with a third segment of the first portion of the structure; and
    a second suspension support assembly connected with the second end of the body support assembly, the second suspension support assembly in communication with a third segment of the second portion of the structure.

11. The adjustable suspension sleep device of claim 10, wherein the structure is a vehicle.

12. The adjustable suspension sleep device of claim 11, further comprising:
a first retention device connected to the first longitudinally extending side of the body support assembly; and
a second retention device connected to the second longitudinally extending side of the body support assembly.

13. The adjustable suspension sleep device of claim 12, wherein:
the first retention device removably receives the first adjustable tensioning assembly; and
the second retention device removably receives the second adjustable tensioning assembly.

14. The adjustable suspension sleep device of claim 10, further comprising:
a first attachment member connected to the first end of the first adjustable tensioning assembly;
a second attachment member connected to the second end of the first adjustable tensioning assembly;
a third attachment member connected to the third end of the second adjustable tensioning assembly; and
a fourth attachment member connected to the fourth end of the second adjustable tensioning assembly.

15. The adjustable suspension sleep device of claim 14, wherein the first, second, third and fourth attachment members include a hook.

16. The adjustable suspension sleep device of claim 10, wherein upon receipt of a body of a person within the front side of the body support assembly, the first longitudinally extending side and second longitudinally extending side are positioned a distance above the body of the person.

17. The adjustable suspension sleep device of claim 10, wherein the first and second adjustable tensioning assemblies are straps.

18. An adjustable suspension sleep device for suspending a person within a vehicle, the adjustable suspension sleep device comprising:
a body support assembly formed by a first side portion, a second side portion, a first end portion, a second end portion, a front portion and a back portion, the first and second side portions arranged parallel to one another and perpendicular to the first and second end portions;
a first longitudinal passage formed along the first side portion of the body support assembly;
a second longitudinal passage formed along the second side portion of the body support assembly;
a first tunnel formed along the first end potion of the body support assembly;
a second tunnel formed along the second end potion of the body support assembly;
a first strap having a first end, a second end, a ratchet buckle, a first hook and a second hook, the ratchet buckle positioned between the first and second ends, the first hook connected to the first end, and the second hook connected to the second end;
a second strap having a first end, a second end, a ratchet buckle, a first hook and a second hook, the ratchet buckle positioned between the first and second ends, the first hook connected to the first end, and the second hook connected to the second end;
the first strap removably received by the first longitudinal passage;
the second strap removably received by the second longitudinal passage;
the first and second straps arranged in parallel to one another;
a first tubular member removably received by the first tunnel;
a second tubular member removably received by the second tunnel;
the first and second tubular members arranged in parallel to one another and perpendicular to the first and second straps;
the first ends of the first and second straps are in self-connecting engagement with a first portion of a vehicle, the first strap partially wraps around a first segment of the first portion of the vehicle, the first hook subsequently engaging the first strap, the second strap partially wraps around a second segment of the first portion of the vehicle, the first hook subsequently engaging the second strap;
the first tubular member in communication with a third segment of the first portion of the vehicle;
the second ends of the first and second straps are in self-connecting engagement with a second portion of the vehicle, the first strap partially wraps around a first segment of the second portion of the vehicle, the second hook subsequently engaging the first strap, the second strap partially wraps around a second segment of the second portion of the vehicle, the second hook subsequently engaging the second strap;
the second tubular member in communication with a third segment of the second portion of the vehicle; and
wherein upon receipt of a body of a person within the body support assembly, the first and second straps are each positioned above the body of the person.

* * * * *

UNITED STATES PATENT AND TRADEMARK OFFICE
CERTIFICATE OF CORRECTION

PATENT NO. : 8,117,691 B2  
APPLICATION NO. : 12/372869  
DATED : February 21, 2012  
INVENTOR(S) : Bishop Page 1 of 1

It is certified that error appears in the above-identified patent and that said Letters Patent is hereby corrected as shown below:

On the Title Page, item (57), under "ABSTRACT", in Column 2, Lines 1-2, delete "suspend and individual" and insert -- suspend an individual --, therefor.

In the Specification  
In Column 4, Line 6, delete "from of" and insert -- from/of --, therefor.

In Column 5, Lines 62-63, delete "bodily support assembly 110." and insert -- bodily support assembly 101. --, therefor.

In Column 6, Lines 42-44, delete "first end 131 and second end 133 of the second adjustable tensioning assembly 130." and insert -- first end 141 and second end 143 of the second adjustable tensioning assembly 140. --, therefor.

In Column 8, Line 41, delete "bodily support assembly 110." and insert -- bodily support assembly 101. --, therefor.

In Column 9, Lines 17-18, delete "bodily support assembly 110." and insert -- bodily support assembly 101. --, therefor.

In Column 12, Lines 39-40, delete "first adjustable tensioning assembly 122" and insert -- first adjustable tensioning assembly 120 --, therefor.

In Column 15, Line 35, delete "first attachment members 121, 141" and insert -- first attachment members 122, 142 --, therefor.

In Column 15, Line 38, delete "first side 106" and insert -- first side 104 --, therefor.

In Column 15, Line 42, delete "second side 107" and insert -- second side 105 --, therefor.

Signed and Sealed this  
Tenth Day of December, 2013

Margaret A. Focarino  
*Commissioner for Patents of the United States Patent and Trademark Office*